US009767505B1

(12) United States Patent
Shi (10) Patent No.: US 9,767,505 B1
(45) Date of Patent: Sep. 19, 2017

(54) ITEM RECOMMENDATIONS IN AN ELECTRONIC MARKETPLACE

(71) Applicant: Amazon Technologies, Inc., Reno, NV (US)

(72) Inventor: Xin Shi, Beijing (CN)

(73) Assignee: Amazon Technologies, Inc., Reno, NV (US)

( * ) Notice: Subject to any disclaimer, the term of this patent is extended or adjusted under 35 U.S.C. 154(b) by 785 days.

(21) Appl. No.: 14/073,568

(22) Filed: Nov. 6, 2013

(51) Int. Cl.
*G06Q 30/00* (2012.01)
*G06Q 30/06* (2012.01)

(52) U.S. Cl.
CPC .................. *G06Q 30/0631* (2013.01)

(58) Field of Classification Search
CPC ........... G06F 7/00; G06Q 10/08; G06Q 30/00
USPC .................. 705/7.31, 26.81, 28, 14.66, 26.7; 235/376
See application file for complete search history.

(56) References Cited

U.S. PATENT DOCUMENTS

| 6,266,649 | B1* | 7/2001 | Linden | G06Q 10/08345 |
| | | | | 705/14.51 |
| 9,189,811 | B1* | 11/2015 | Bhosle | G06Q 30/0631 |
| 2011/0173078 | A1* | 7/2011 | Hicks | G06Q 30/0269 |
| | | | | 705/14.66 |
| 2014/0156466 | A1* | 6/2014 | Westphal | G06Q 30/0635 |
| | | | | 705/26.81 |

\* cited by examiner

*Primary Examiner* — Rokib Masud
(74) *Attorney, Agent, or Firm* — Kilpatrick Townsend & Stockton LLP (57) ABSTRACT

Techniques are disclosed to provide an item recommendation service in an electronic marketplace. Recommendations may be provided to a user of an electronic marketplace to offer an item via the electronic marketplace based on identifying requests for items from other users. In at least one embodiment, the request for an item from the other users may be identified as an item other than a plurality of items offered by the electronic marketplace or by the user. One or more sellers who offer items similar to the requested item may be identified based on a category of the requested item. A recommendation may be provided to an identified seller to offer the requested item via the electronic marketplace.

24 Claims, 6 Drawing Sheets

ITEM RECOMMENDATIONS IN AN ELECTRONIC MARKETPLACE

BACKGROUND

It has become common for merchants to utilize an electronic forum that provides users with the ability to review and/or order items using an electronic catalog of items. Users may typically offer an item for sale via an electronic marketplace based on pre-owned items and/or new items owned by the user. For example, a user (e.g., a seller) may offer an item for sale via the marketplace by adding the item to the marketplace or by adding the item to an existing listing for the item in the electronic catalog. However, oftentimes, a seller may typically list items for sale via the electronic marketplace without knowledge of another user's (e.g., a buyer's) interest in the items. As such, sellers and/or merchants face challenges when providing items via such electronic marketplaces.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Some or all of the processes described herein may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques described herein may include providing a recommendation to offer an item via an electronic marketplace. In some examples, the recommendation may be based at least in part on identifying requests for items from other users of the electronic marketplace or from users of other electronic (e.g., network-based) services. In at least one embodiment, the request for an item may be identified as an item other than one of the items offered by the electronic marketplace. In accordance with at least one embodiment, information that signals a request for an item may be identified when the user accesses an electronic marketplace and/or third-party network content (e.g., a third-party search engine, a third-party electronic marketplace, a social media service, or the like). Additionally, in some examples, the information that signals a request for an item may include an identity of a search term for the requested item submitted by the user via a search query interface provided by the electronic marketplace. In another example, the information may include an identity of search results related to search queries performed by the user via the third-party network content. The information may also be identified based at least in part on an analysis of parsed network content in the search results that can identify information about the requested item. In some examples, information that signals a request for an item may also include an identity of an image of the requested item or an identity of a scanned bar code of the item submitted by the user via the electronic marketplace website.

In accordance with at least one embodiment, the category of the requested item may be determined. In accordance with at least one embodiment, one or more other users offering one or more items (e.g., for sale) that are similar to the requested item may be identified based on the category or other information associated with the requested item. In accordance with at least one embodiment, the sellers may be identified by determining a similarity measure between the requested item and the items offered by the sellers, based on the determined category of the requested item. Additionally, a recommendation may be provided to the identified sellers to offer the requested item via the electronic marketplace. In some examples, the identified sellers may be notified by providing a recommendation of the requested item to the sellers via a user interface screen that can be rendered on the sellers' device.

In one non-limiting example, a user may utilize a computing device to search for an "Outdoor Beach Umbrella" via a third-party search engine. In some examples, the service provider (e.g., the electronic marketplace) may identify whether the "Outdoor Beach Umbrella" is listed in an electronic catalog. If it is determined that the item is not currently offered by the electronic marketplace, then to the system may determine a category of the requested item. For example, the system may determine that the "Outdoor Beach Umbrella" falls under the category, "Patio, Lawn, & Garden." Based at least in part on this category, the system may identify a seller of the electronic marketplace that offers other similar items and/or items of the "Patio, Lawn, & Garden" category. For example, the system may identify a seller who offers a "Patio Umbrella," or other "Patio, Lawn, & Garden" items. Further, in some examples, the system may provide a recommendation to the identified seller, to offer the requested "Outdoor Beach Umbrella" via the marketplace.

Figure 1:
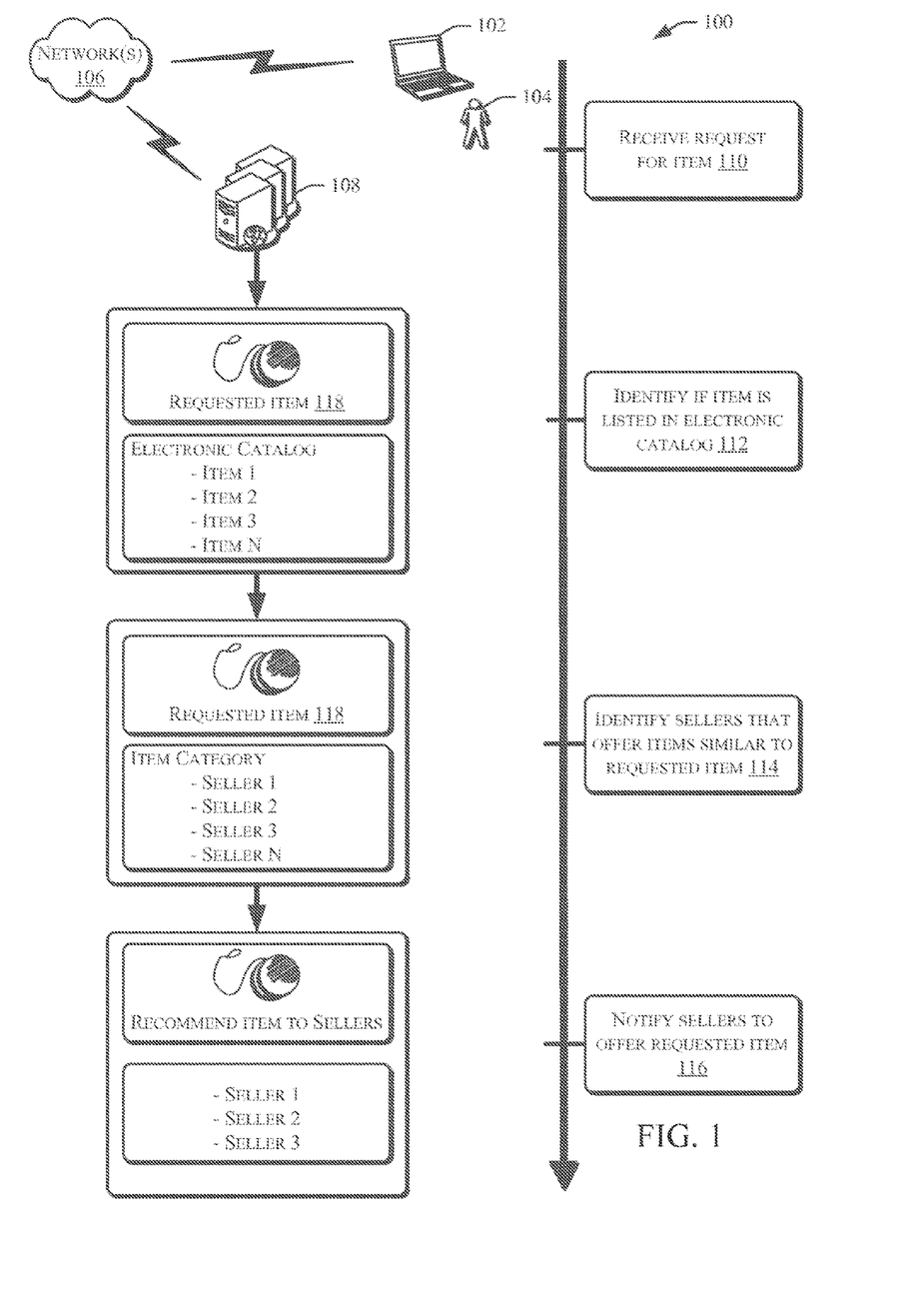
FIG. 1 illustrates an example environment for implementing the features of an item recommendation service that may recommend items to be offered by sellers within an electronic marketplace, described herein.

FIG. 1 illustrates an example environment 100 for implementing the features of an item recommendation service that may recommend items to be offered by sellers within an electronic marketplace, as described herein. As described herein, an electronic marketplace may generally refer to a virtual market through which users may buy and sell items using an electronic catalog of items. As described herein, the term 'users' may refer to an individual, a set of individuals, or a programmatic object associated with a particular user account in the electronic marketplace. In accordance with at least one embodiment, a user may refer to a 'buyer' or a 'seller' of items listed in the marketplace.

In some embodiments, a user 104 (i.e., electronic marketplace consumers or web browser users) may utilize a user computing device 102 to access a browser application (e.g., a web browser) or a user interface accessible through the browser application via one or more networks 106. In some aspects, the browser application may be configured to receive, store, and/or display network content (e.g., the electronic marketplace website and/or other third-party network content), or other interface on a display screen of the user device 102.

The user device 102 may include any type of computing device such as, but not limited to, a mobile phone, a smart phone, a personal digital assistant (PDA), a laptop computer, a desktop computer, a thin-client device, a tablet PC, an electronic book (e-book) reader, etc.

Figure 2:
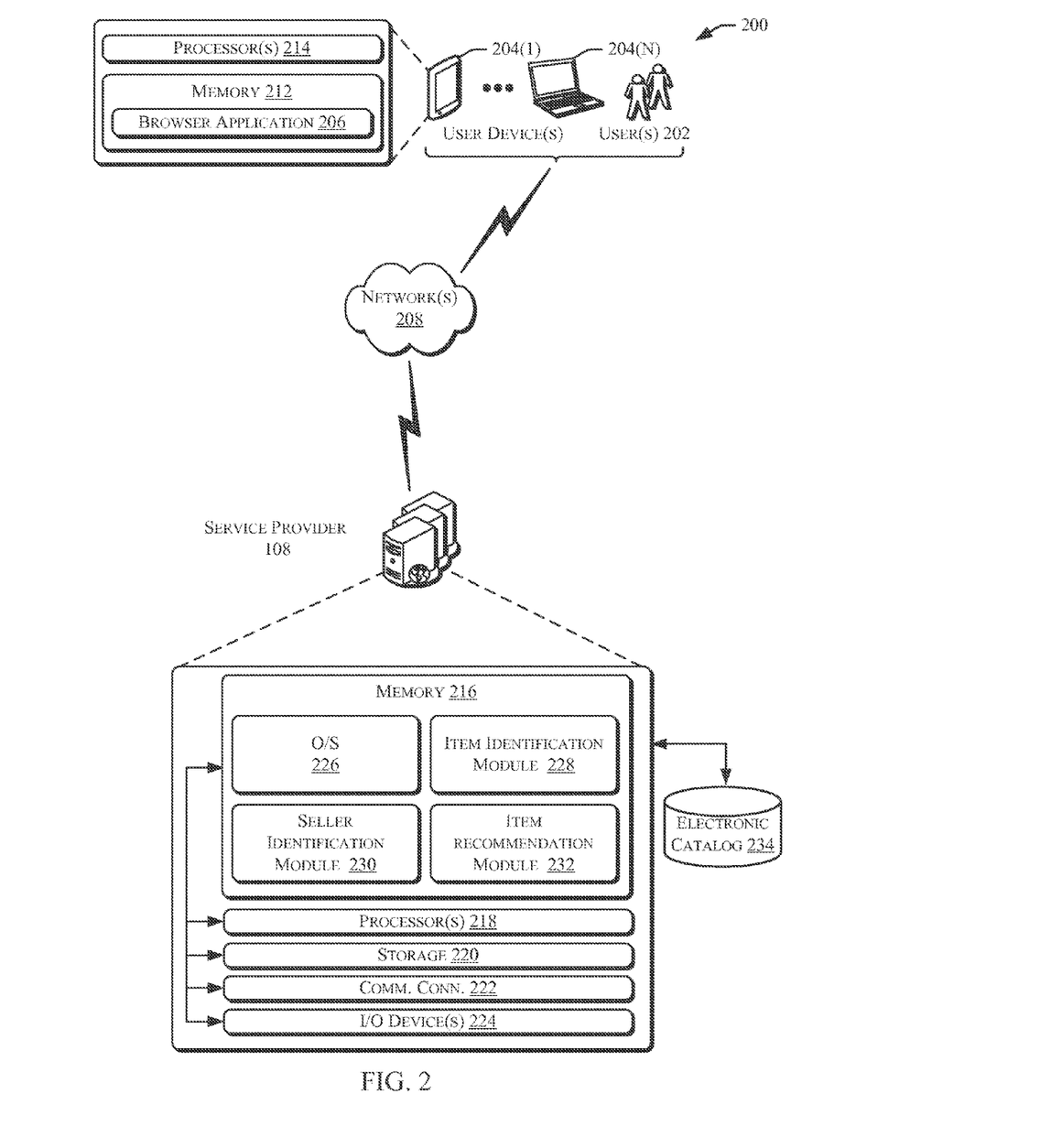
FIG. 2 depicts an illustrative system or architecture of an item recommendation service that may recommend items to be offered by sellers within an electronic marketplace, described herein.

In some embodiments, the electronic marketplace website may be hosted, managed, and/or provided by an electronic marketplace computing system, such as by utilizing the service provider computers 108 (described in FIG. 2). In some examples, the networks 106 may include any one or a combination of many different types of networks, such as cable networks, the Internet, wireless networks, cellular networks and other private and/or public networks.

In accordance with at least one embodiment, the user 104 may access the browser application on the user's device 102 to search for, browse or purchase items via the electronic marketplace and/or via other third-party service provider content (e.g., a third-party search engine, a search engine associated with the electronic marketplace, a third-party electronic marketplace, or the like). As described herein, an item may include a physical item of manufacture, a media item, a digital item (for e.g., music, movie or software), and/or a service (e.g., a virtual computer that provides specific services to users) and the like.

In accordance with at least one embodiment, the service provider computers 108 may be configured to perform one or more operations to receive a request for an item from a user of an electronic marketplace and provide a recommendation to one or more users (e.g., sellers) to offer the requested item via the electronic marketplace, based at least in part on identifying that the requested item is not currently offered via the electronic marketplace and/or that the requested item is not currently offered by the one or more users. The operations performed by the service provider computers 108 are described in detail below.

In accordance with at least one embodiment, at 110, the service provider computers 108 may be configured to perform one or more operations to identify information that signals a request for an item (e.g., 118) from the user 104. As an example, the information that signals a request for the item 118 may include an identity of a search term (e.g., 'Multi-Color Yo-Yo String') for the requested item submitted by the user 104 via a search query interface provided by the electronic marketplace website. As another example, the information that signals a request for an item (e.g., 118) may include an identity of search results related to search queries performed by the user via a third-party search engine. The manner in which the service provider computers 108 may identify information that signals a request for an item is discussed in detail in FIG. 2.

In other examples, the information that signals a request for an item 118 may also include an identity of an image of the requested item or an identity of a scanned bar code of the item submitted by the user via the electronic marketplace website. For example, the user 104 may search for an item by submitting a picture of the item via the electronic marketplace by utilizing an in-built camera in the user's device to take a picture of an item. Similarly, the user may utilize a bar code scanning application on the user's device to scan bar code of the item that the user may wish to purchase.

Upon identifying information that signals a request for the item (e.g., 118) from the user 104 as discussed above, the service provider computers 108 may be configured to perform one or more additional operations. The operations may include any combination of actions and/or instructions to be performed by one or more processors of the service provider computers 108 in conjunction with at least one or more respective local or remote storage locations associated with the service provider computers 108. In accordance with at least one embodiment, the service provider computers 108 may be configured to perform one or more operations 112 to identify if the item is listed in an electronic catalog of the electronic marketplace. As described herein, an electronic catalog may include a database of information about items that may be listed by users of the electronic marketplace. The information may typically include item identifiers, descriptions and item images provided by manufacturers or distributors of the items. In some examples, the information about the items listed in the electronic marketplace may be viewable by the user 104 of the user device 102 by browsing the electronic catalog.

In accordance with at least one embodiment, the service provider computers 108 may be configured to perform one or more operations to identify if the item 118 is listed in an electronic catalog by comparing the requested item 118 to a list of items stored in an electronic catalog. If the requested item is not listed in the electronic catalog, then, in some embodiments, the service provider computers 108 may be configured to perform one or more operations to determine the category of the requested item.

Further, in some examples, the service provider computers 108 may be configured to perform one or more operations at 114 to identify a plurality of sellers of the electronic marketplace that offer one or more items that are similar to the requested item. In accordance with at least one embodiment, the service provider computers 108 may be configured to identify the plurality of sellers by determining a similarity measure between the requested item and at least a second item offered by the sellers, based on the determined category and identify at least one seller from the plurality of sellers, based at least in part on the similarity measure.

The service provider computers 108 may then be configured to perform one or more operations at 116 to notify the sellers to offer the requested item via the electronic marketplace. In some examples, the notification may be performed by providing a recommendation of the requested item to the sellers via a user interface screen that can be rendered on the user's browser application. The operations performed by the service provider computers 108 are discussed in detail in FIG. 2.

FIG. 2 depicts an illustrative system or architecture 200 of an item recommendation service that may recommend items to be offered by sellers within an electronic marketplace, described herein. In architecture 200, one or more users 202 (i.e., electronic marketplace consumers or web browser users) may utilize user computing devices 204(1)-(N) (collectively, user devices 204) to access a browser application 206 (e.g., a web browser) or a user interface accessible through the browser application 206 via one or more networks 208. In some aspects, the browser application 206 may be configured to receive, store, and/or display a website (e.g., the electronic marketplace website), or other interface on a display screen of the user devices 204. In accordance with at least one embodiment, in addition to accessing the browser application 206, the users 202 may also utilize one or more native applications (e.g., a software application program) developed for use on a particular platform compatible with the user devices 204 to access the electronic marketplace website and/or other third-party websites.

As discussed with reference to FIG. 1, the electronic marketplace website may be hosted, managed, and/or provided by an electronic marketplace, such as by utilizing one or more service provider computers 108. The one or more service provider computers 108 may, in some examples, provide computing resources such as, but not limited to, data storage, data access, management, virtualization, cloud-based software solutions, electronic content performance management, and the like. The one or more service provider computers 108 may also be operable to provide web hosting, computer application development, and/or implementation platforms, combinations of the foregoing or the like to the one or more users 202.

In some examples, the networks 208 may be the same or similar as the networks 106 described with reference to FIG. 1. While the illustrated example represents the users 202 accessing the browser application 206 over the networks 208, the described techniques may equally apply in instances where the users 202 interact with the service provider computers 108 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

In accordance with at least one embodiment, the browser application 206 may allow the users 202 to interact with the service provider computers 108, such as to access information associated with items offered by the electronic marketplace, as described herein. The one or more service provider computers 108, perhaps arranged in a cluster of servers or as a server farm, may host the electronic marketplace website and/or cloud-based software services. Other server architectures may also be used to host the electronic marketplace website and/or cloud-based software services. The browser application 206 can also provide any type of website that supports user interaction, including third-party network content (e.g., a third-party search engine, a third-party electronic marketplace, a social media service, or the like). The described techniques may similarly be implemented outside of the browser application 206, such as with other applications running on the user devices 204.

The user devices 204 may be the same or similar to the user device 102 described with reference to FIG. 1 and may include any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the service provider computers 108 via the networks 208, or via other network connections.

Additionally, the user devices 204 may be part of the distributed system managed by, controlled by, or otherwise part of the service provider computers 108.

In one illustrative configuration, the user devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including an item recommendation service that may recommend items to sellers, such as via the browser application 206 or dedicated applications (e.g., smart phone applications, tablet applications, etc.). In accordance with at least one embodiment, the browser application 206 may be configured to receive requests for items from one or more users via the electronic marketplace and/or via other third party network content (e.g., a third-party search engine, a third-party electronic marketplace, a social media service, or the like), provide information related to the requested items to the service provider computers 108 and display recommendations of items to one or more users (e.g., sellers) of the electronic marketplace to offer the requested items via the electronic marketplace. Additionally, the memory 212 may store access credentials and/or other user information such as, but not limited to, user IDs, passwords, and/or other user information.

In some aspects, the service provider computers 108 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In one illustrative configuration, the service provider computers 108 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 108, the memory 216 may be volatile (such as RAM) and/or non-volatile (such as ROM, flash memory, etc.). The service provider computers 108 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 108. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 108 may also contain communications connection(s) 222 that allow the service provider computers 108 to communicate with a stored database, another computing device or server, user terminals and/or other devices on the networks 208. The service provider computers 108 may also include I/O device(s) 224, such as a keyboard, a mouse, a pen, a voice input device, a touch input device, a display, speakers, a printer, etc.

Turning to the contents of the memory 216 in more detail, the memory 216 may include an operating system 226 and/or one or more application programs, modules, or services for implementing the features disclosed herein, including an item recommendation service that may recommend items to be offered by sellers within the electronic marketplace. In accordance with at least one embodiment, the service may include functionality by which a recommendation may be provided to one or more users (e.g., sellers) of the electronic marketplace to offer an item requested by one or more users via the electronic marketplace, based at least in part on identifying that the item requested by the users is not currently offered via the electronic marketplace.

In accordance with at least one embodiment, the memory 216 may include a plurality of modules such as an item identification module 228, a seller identification module 230 and an item recommendation module 232 configured to implement functionality of a seller item recommendation service, described herein. These modules may be implemented as software modules, hardware modules, or a combination thereof. If the modules are software modules, the modules can be embodied on a computer readable medium and processed by a processor in any of the computer systems described herein. It should be noted that any module or data store described herein, may be, in accordance with at least one embodiment, a service responsible for managing data related to items in the electronic marketplace. The modules may be configured in the manner suggested in FIG. 2 or may exist as separate modules or services external to the service provider computer 108, in other embodiments.

In accordance with at least one embodiment, the item identification module 228 may be configured to perform one or more operations to identify information that signals a request for items from one or more users (e.g., user(s) 202) of the electronic marketplace. A signal for a request for an item may be received, for example, when the user 202 accesses the browser application 206 on the user's device 204 to search for, browse or purchase items via the electronic marketplace and/or via third-party network content (e.g., a third-party search engine, a third-party electronic marketplace, a social media service, or the like)

In one embodiment, the operations performed by the item identification module 228 to identify information that signals a request for an item from the user may include the identity of a search term for a requested item submitted by the user 202. As an example, if a user wishes to search for media content related to a particular artist, the user may enter a search term such as 'Album A from Artist B' via a search query interface provided by the electronic marketplace website.

In accordance with at least one embodiment, the item identification module 228 may also be configured to perform one or more operations to identify information that signals a request for an item based at least in part on analyzing parsed network content in search results related to search queries submitted by one or more users (e.g., users 202) via third-party network content (e.g., a third-party search engine, a third-party electronic marketplace, a social media service, or the like).

As an example, consider that a user accesses the browser application 206 to search for media content related to an artist using a third-party search engine during a browsing session. The search engine may then display a set of search results that include a list of songs and/or albums associated with the artist and/or a musical group associated with the artist. A web crawler application provided by the third-party search engine may be configured to parse the network content in the search results to identify links such as visible text, hyperlinks and/or the content of various tags used in the search results to identify information related to the requested item. As an example, the web crawler application may be configured to parse the network content in the search results on a periodic basis, such as once per day or once per week, using an offline process and provide the parsed network content to the item identification module 228.

In some embodiments, the item identification module 228 may then be configured to perform one or more operations to identify information that signals a request for an item by analyzing the parsed network content. As an example, if the user has entered a search term such as 'Album A from Artist B' via a search query interface provided by the third-party search engine, then the item identification module 228 may analyze the parsed network content to identify that the requested item submitted by the user is 'Album A from Artist B.'

In other embodiments, item identification module 228 may also be configured to identify additional information related to the requested item by analyzing the parsed network content. For example, the item identification module 228 may be configured to identify a click stream of one or more links visited by the user (for e.g., to other third-party web sites) by analyzing the parsed network content. As an example, by analyzing a click stream of links in the parsed network content, the item identification module 228 may identify additional information associated with the artist such as particular albums for sale by the artist and/or pricing information related to these albums.

In some embodiments, the item identification module 228 may be configured to analyze the parsed network content to identify a 'popular' requested item. As described herein, a 'popular' requested item may refer to an item which satisfies some pre-specified popularity criteria. For example, in one embodiment, a requested item may be treated as popular if the item has appeared in the search results and has been viewed more than a threshold number of times by a pre-defined number of users during a browsing session.

In other embodiments, in addition to identifying information that signals a request for an item from one or more users based on search terms entered by the users and based on analyzing parsed network content in search results as discussed above, the item identification module 228 may also perform one or more operations to identify information that signals a request for an item by identifying at least one of an image of an item submitted by the users or identifying a bar-code scan of an item submitted by the users via the electronic marketplace website. For example, a user may submit a picture of an album's cover art or a picture of an artist to search for media content related to a particular artist via the electronic marketplace website. The item identification module 228 may then identify information that signals a request for the item based at least in part on the image submitted by the user. In other examples, a user may scan a barcode of an album related to the artist to search for media content related to a particular artist via the electronic marketplace website. The item identification module 228 may then identify information that signals a request for the item based at least in part on the scanned bar code of the item.

Based on identifying information that signals a request for an item as discussed above, in accordance with at least some embodiments, the item identification module 228 may then be configured to perform one or more operations to identify if the requested item is offered via the electronic marketplace. In one embodiment, the item identification module 228 may perform one or more operations to identify if the requested item is offered via the electronic marketplace by comparing an identifier of the requested item with a plurality of identifiers corresponding to a plurality of items listed in an electronic catalog 234 of the electronic marketplace.

In some examples, the identifier of a requested item may correspond to a text string used to describe the item. For example, the identifier of a requested item such as 'Album A by Artist B' may correspond to the name of the album (e.g., 'Album A') or the name of the artist (e.g., 'Artist B') associated with the album. Thus, in some embodiments, the item identification module 228 may perform one or more operations to perform a text pattern matching operation to identify if the requested item is listed in the electronic catalog 234. In other embodiments, the identifier of the requested item may include a scanned bar code and/or a product identifier associated with the requested item and the item identification module 228 may be configured to perform one or more operations to compare the identifier of the requested item with a plurality of identifiers corresponding to a plurality of items listed in an electronic catalog 234 based at least in part on the scanned bar code and/or the product identifier.

If it is determined that the requested item is not offered by the electronic marketplace, then in some embodiments, the item identification module 228 may be configured to perform one or more operations to determine a category associated with the requested item. For example, the category of a requested item such as 'Album A by Artist B' may relate to the genre of the media content pertaining to the album such as 'Jazz', 'Rock', 'Classical' and the like.

In accordance with at least one embodiment, based on the determined category of the requested item, a plurality of users (e.g., sellers) of the electronic marketplace that offer at least a second item corresponding to the determined category of the requested item may then be identified. In some embodiments, the seller identification module 230 may be configured to perform one or more operations to identify the plurality of sellers by determining a similarity measure between the requested item and at least a second item offered by the plurality of sellers, based on the determined category and identifying at least one seller from the plurality of sellers, based at least in part on the similarity measure.

As an example, consider that the category for a requested item is determined to be 'Jazz'. The seller identification module 230 may then be configured to perform one or more operations to determine a similarity measure between the requested item and one or more items offered by a plurality of sellers of the electronic marketplace based at least in part on the determined category of the requested item. In one embodiment, the similarity measure may be determined by determining if the category of the requested item matches one or more categories of items sold by each of the plurality of sellers. In some embodiments, the similarity measure may also be determined by identifying if a sub-category of the requested item matches a sub-category of one or more items sold by the plurality of sellers after performing a match based on the category. For example, if the sub-category of the requested item is identified to be 'Fusion-Jazz', then the items offered by each of the plurality of sellers under the sub-category 'Fusion-Jazz' may be identified.

In accordance with at least one embodiment, the similarity measure may be determined by assigning a value (e.g., such as 'high', medium' or 'low') to each item offered by the plurality of sellers based on identifying if the category and/or sub-category of the requested item matches one or more categories and/or sub-categories of items sold by each of the plurality of sellers. For example, consider that a seller offers 10 items and the category and/or sub-category of one or more of these items is identified to be 'Jazz'/'Fusion-Jazz.' Then, in one example, a 'high' similarity measure may be assigned to these items. Similarly, if some of the other items offered by the seller are identified to correspond to the 'Jazz' category but belong to another sub-category of 'Jazz' such as, 'Smooth-Jazz' then, in one example, the similarity measure assigned to these items may be 'medium'. If some items offered by the seller are identified to correspond to a category that is different from the category of the requested item, such as 'Hip-Hop' then, in one example, these items may be assigned a 'low' similarity measure.

Upon determining the similarity measures as described above, in some embodiments, the seller identification module 230 may then be configured to perform one or more operations to assign a value to each of the plurality of sellers based on the determined similarity measure. In one embodiment, the value assigned to a seller may be a ratio of the number of items offered by the seller that have been assigned a 'high' similarity measure to the total number of items offered by the seller. As an example, the value assigned to a seller that offers 10 items via the electronic marketplace of which 7 of these items are assigned a 'high' similarity measure may be 0.7, in one embodiment.

In some embodiments, the seller identification module 230 may then be configured to perform one or more operations to identify at least one seller as offering one or more items that are similar to the requested item based on the assigned value. In some examples, the seller may be identified based on comparing the value assigned to the seller to a pre-determined threshold. For example, a seller may be identified if the value assigned to the seller is greater than or equal to the pre-determined threshold, in one embodiment.

While the above discussion relates to identifying sellers who offer items similar to the requested item by matching the category and/or sub-category of the requested item to one or more categories and/or sub-categories of items sold by each of the plurality of sellers, it is to be appreciated that other techniques for identifying sellers who offer items similar to the requested item may be implemented in other embodiments. For example, in accordance with at least one embodiment, a clustering technique may be employed to identify sellers who offer items similar to a requested item by grouping the sellers of the electronic marketplace into various clusters/segments. As an example, an initial set of segments may be identified based on various categories of items listed in the electronic catalog. For example, segments may be identified based on categories such as books, music, toys, furniture, electronic products and the like. A seller from the plurality of sellers may then be added to a segment by identifying if the seller offers an item corresponding to the category of the segment. For example, if the initial identified segments correspond to music, toys and books and if a seller offers items in each of these categories, then the seller may be added to each of these segments. After all the sellers in the electronic marketplace have been added to one or more of these segments, then the one or more sellers who offer items similar to a requested item (e.g., 'Multi-Color Yo-Yo String') may be identified by identifying the sellers within the segment (e.g., 'Toys') that correspond to the category (e.g., 'Toys') of the requested item.

In accordance with at least one embodiment, the item recommendation module 232 may then be configured to provide a recommendation to the identified sellers to offer the item via the electronic marketplace. In some examples, the item recommendation module 232 may include a graphical user interface which may serve as the back-end component configured to implement a user interface screen that can be rendered on the user's browser application (e.g., 206) at the user devices. In one embodiment, the user interface screen may provide a recommendation of the requested item to the identified sellers in the form of an electronic message. In some examples, the recommendation of the requested item may be provided to the sellers on the user interface screen when the sellers access the electronic marketplace website via the browser application.

In accordance with some embodiments, the item recommendation module 232 may also be configured to provide a recommendation to one or more sellers of the electronic marketplace to offer items based on identifying one or more items offered by the sellers. As an example, the item recommendation module 232 may be configured to perform one or more operations to identify an item (e.g., 'item 1') offered by a seller (e.g., 'seller A') of the electronic marketplace. Then, the item recommendation module 232 may be configured to perform one or more operations to identify other sellers (e.g., 'seller B') in the electronic marketplace who also offer the item (e.g., 'item 1'). The item recommendation module 232 may then be configured to perform one or more operations to identify other items (e.g., 'item 2') offered by the seller (e.g., 'seller B'). In some embodiments, the item recommendation module 232 may then be configured to perform one or more operations to provide a recommendation to the seller (e.g., 'seller A') to offer the item (e.g., 'item 2') offered by the seller (e.g., 'seller B') via the electronic marketplace. In some embodiments, the recommendation may be provided based on determining the number of users who have purchased the item (e.g., 'item 2') via the electronic marketplace.

Figure 3:
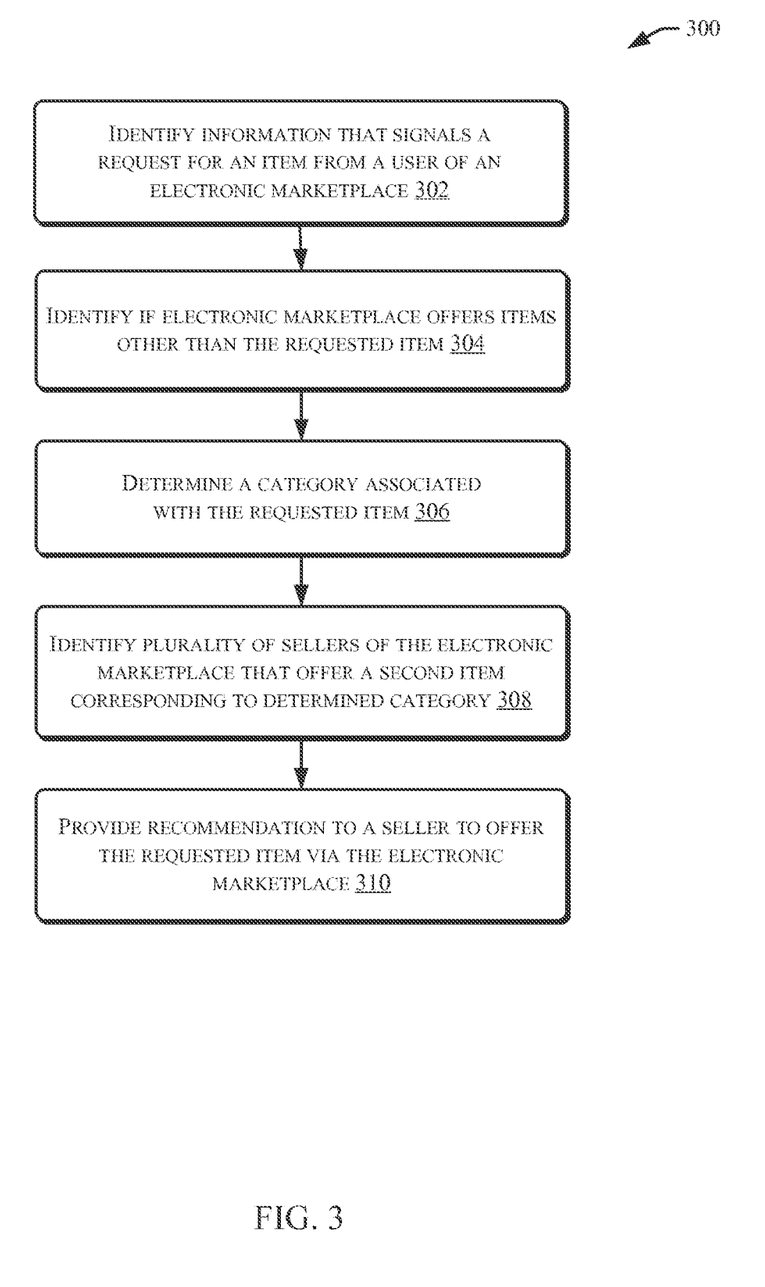
FIG. 3 illustrates a flow diagram of an example process of an item recommendation service that may recommend items to be offered by sellers within an electronic marketplace, as described herein.
Figure 4:
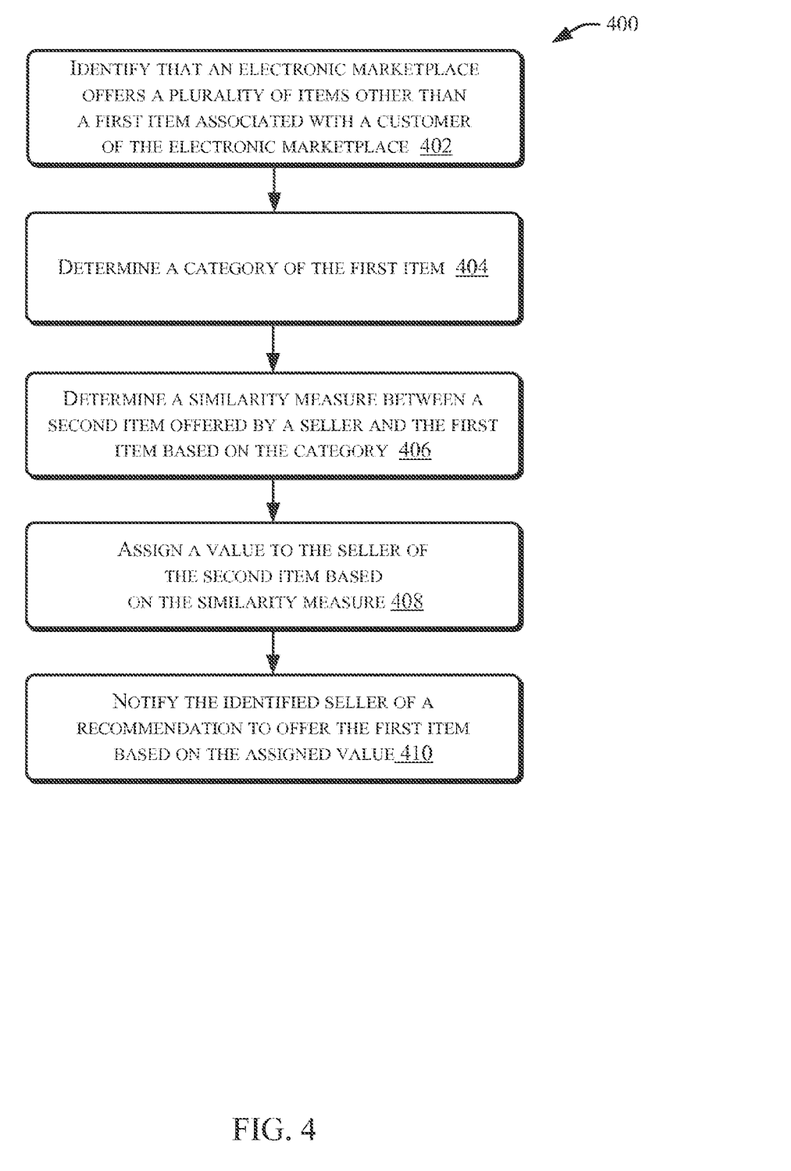
FIG. 4 illustrates a flow diagram of an example process of an item recommendation service that may recommend items to be offered by sellers within an electronic marketplace, as described herein.
Figure 5:
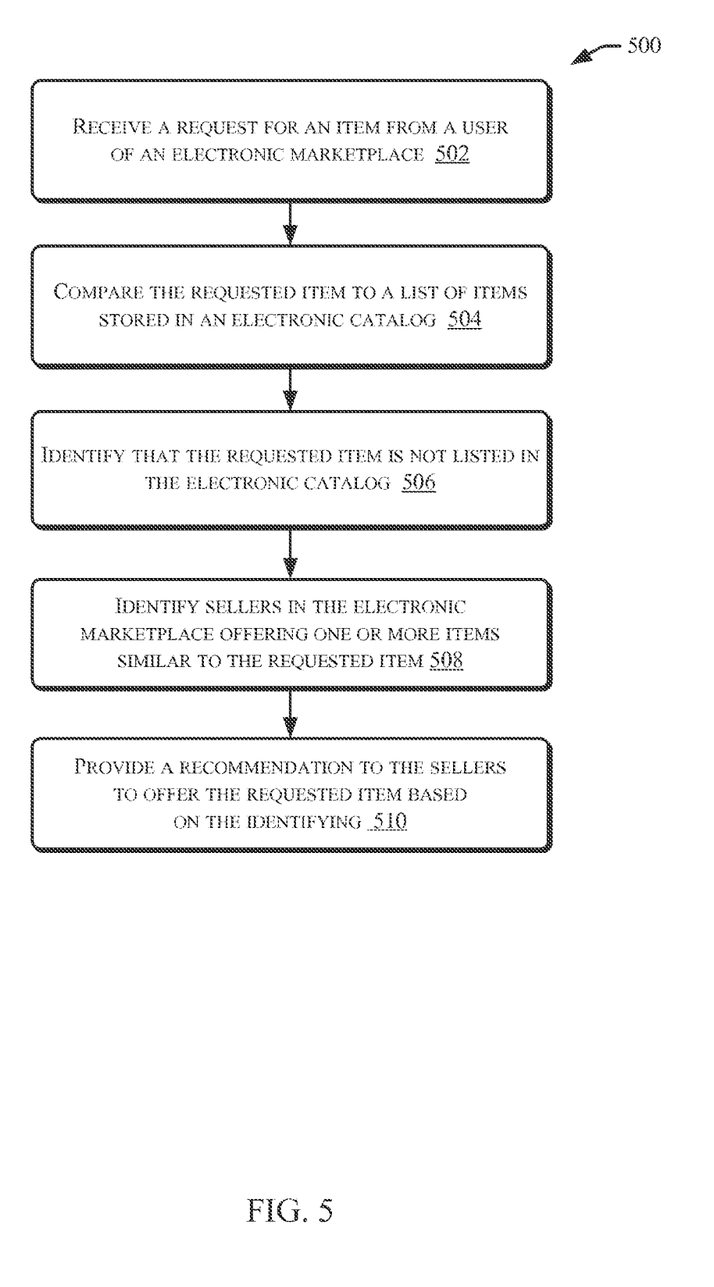
FIG. 5 illustrates a flow diagram of an example process of an item recommendation service that may recommend items to be offered by sellers within an electronic marketplace, as described herein.

FIGS. 3-5 illustrate example flow diagrams showing respective processes 300, 400 and 500 of an item recommendation service that may recommend items to be offered by sellers within an electronic marketplace, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

FIG. 3 illustrates a flow diagram of an example process 300 of an item recommendation service that may recommend items to be offered by sellers within an electronic marketplace, as described herein. The process at 300 may begin at 302 by including identifying information that signals a request for an item from a user of an electronic marketplace (e.g., by utilizing the service provider computers 108). In one example, information that signals a request for an item may include an identity of a search term (e.g., 'Multi-Color Yo-Yo String') for the requested item submitted by the user via a search query interface provided by the electronic marketplace website. In another example, information that signals a request for an item may include an identity of search results related to search queries performed by the user via third-party network content and an analysis of parsed network content in the search results that can identify information about the requested item. In other examples, information that signals a request for an item may also include an identity of an image of the requested item or an identity of a scanned bar code of the item submitted by the user via the electronic marketplace website. At 304, the process 300 may include identifying by the service provider computers 108 that the electronic marketplace offers a plurality of items other than the item requested by the user. In an example, the process at 304 may be performed based at least in part on a comparison of an identifier of the requested item with a plurality of identifiers corresponding to the plurality of items. In some examples, at 306, the process at 300 may include determining a category of the requested item. At 308, the process 308 may include identifying a plurality of sellers of the electronic marketplace that offer at least a second item corresponding to the determined category. In accordance with at least one embodiment, the plurality of sellers may be identified by determining a similarity measure between the requested item and at least a second item offered by the sellers, based on the determined category. One or more sellers from the plurality of sellers may then be identified, based at least in part on the similarity measure. At 310, the process 300 may include providing a recommendation to at least one seller of the plurality of sellers to offer the requested item via the electronic marketplace.

FIG. 4 illustrates a flow diagram of an example process 400 of an item recommendation service that may recommend items to be offered by sellers within an electronic marketplace, as described herein. The process at 400 may begin at 402 by including identifying than an electronic marketplace offers a plurality of items other than a first item associated with a customer of the electronic marketplace. As used herein, a 'customer' may refer to a 'buyer' or a 'seller' of items listed in the marketplace. In some examples, the first item may refer to an item requested by the customer of the electronic marketplace. As discussed above, information that signals a request for an item from the customer may include an identity of a search term for the requested item. Information that signals a request for an item from the customer may include an identity of search results related to search queries performed by the user and analyzing parsed network content in the search results to identify information about the requested item. In some examples, information that signals a request for an item from the customer may also include an identity of an image of the item or an identity of a scanned barcode of the item submitted by the user. In some examples, and as described in FIG. 2, the process at 402 may include comparing an identifier of the first item with a plurality of identifiers corresponding to a plurality of items listed in an electronic catalog 234 of the electronic marketplace. If it is determined that the first item is not offered via the electronic marketplace, then in some examples, at 404, the process 400 may include determining a category of the first item. At 406, the process 400 may include identifying one or more sellers of the electronic marketplace that offer a second item that is similar to the first item by determining a similarity measure between the first item and the second item, based on the determined category. In some examples, and as discussed with reference to FIG. 2, the similarity measure may be determined by assigning a value (e.g., such as 'high', medium' or 'low') to the second item based on identifying if the category and/or sub-category of the first item matches a category and/or sub-category of the second item offered by the one or more sellers. At 408, the process at 400 may include assigning a value to the one or more sellers based on the determined similarity measure and identifying at least one seller of the one or more sellers based on the assigned value. In one example, and as discussed with reference to FIG. 2, the value assigned to a seller may be a ratio of the number of items offered by the seller that have been assigned a 'high' similarity measure to the total number of items offered by the seller. At 410, the process 400 may include notifying the identified seller of a recommendation to offer the first item via the electronic marketplace. In some examples, the identified seller may be notified when the value assigned to the seller is greater than or equal to a pre-determined threshold value.

FIG. 5 illustrates a flow diagram of an example process 500 of an item recommendation service that may recommend items to be offered by sellers within an electronic marketplace, as described herein. The process at 500 may begin at 502 by including receiving a request for an item from a user of an electronic marketplace 502. At 504, the process 500 may include comparing the item requested by the user to a list of items stored in an electronic catalog of the electronic marketplace system. At 506, the process 500 may include identifying that the item requested by the user is not listed in the electronic catalog, based at least in part on the comparing. At 508, the process 500 may include identifying at least one or more sellers in the electronic marketplace system offering one or more items that are similar to the item requested by the user. In some examples, the sellers may be identified based on determining a similarity measure between one or more items offered by the sellers and the requested item based on the determined category. At 510, the process 500 may include providing a recommendation to the at least one or more sellers, to offer the item requested by the user, based at least part on the identifying.

Figure 6:
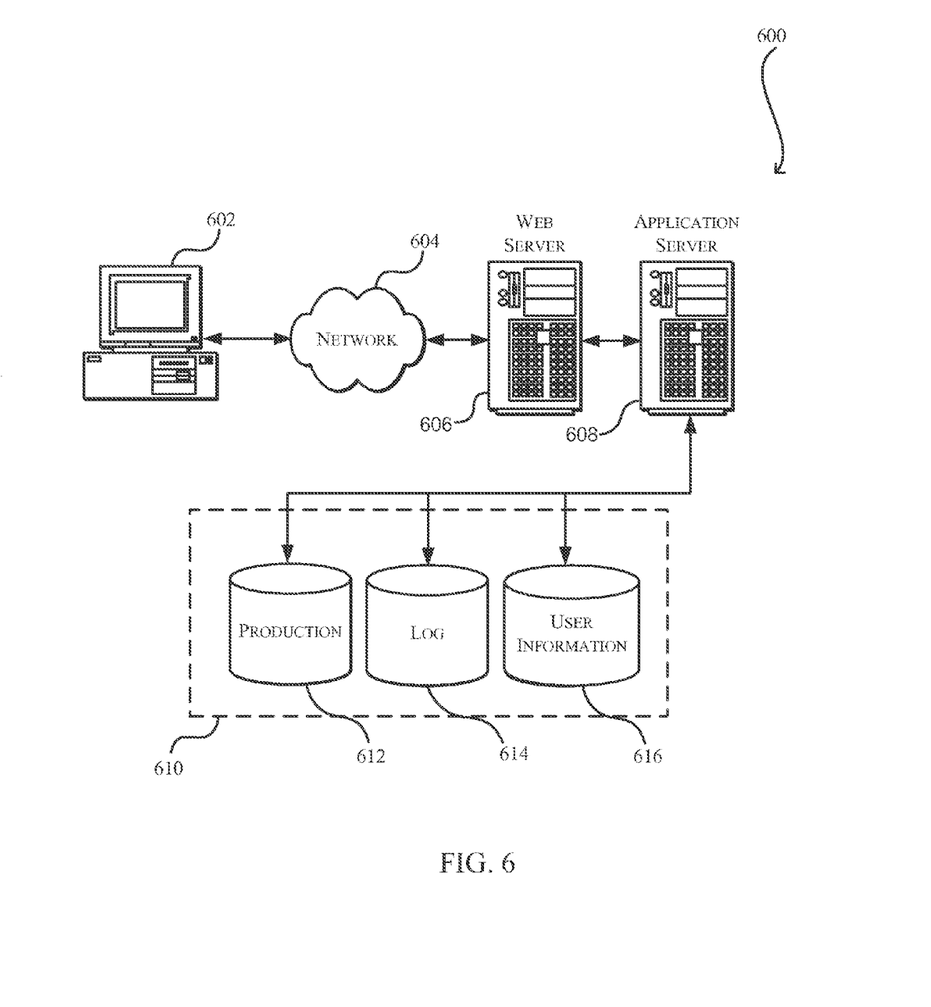
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 600. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
identifying information that signals a request for an item from a user of an electronic marketplace;
identifying, by one or more computer systems of the electronic marketplace, that the electronic marketplace offers a plurality of items other than the item requested by the user based at least in part on a comparison of an identifier of the requested item with a plurality of identifiers corresponding to the plurality of items;
determining a category associated with the requested item;
identifying a plurality of sellers of the electronic marketplace that offer at least a second item corresponding to the determined category;
computing an item similarity score for individual items offered by the plurality of sellers, the item similarity score being based at least in part on the category associated with the requested item;

determining respective seller similarity scores for the plurality of sellers, the respective seller similarity scores individually indicating a degree of similarity between a particular seller of the plurality of sellers and a seller of the requested item, the respective seller similarity scores being based at least in part on the item similarity score for the individual items offered by the plurality of sellers;

identifying a subset of the plurality of sellers based at least in part on the respective seller similarity scores; and providing a recommendation to the subset of the plurality of sellers to offer the requested item via the electronic marketplace.

2. The computer-implemented method of claim 1, wherein the identified information that signals the request comprises a search term for the requested item submitted by the user via a search query interface provided by the electronic marketplace.

3. The computer-implemented method of claim 1, wherein the identified information that signals the request comprises a search result related to a search query for the requested item submitted by the user via third-party network content.

4. The computer-implemented method of claim 1, wherein the identified information that signals the request comprises at least one of an image of the requested item or a bar-code scan of the requested item.

5. The computer-implemented method of claim 1, wherein providing the recommendation comprises notifying the subset of the plurality of sellers via an electronic message.

6. The computer-implemented method of claim 1, wherein the respective seller similarity scores are determined by:

determining a number of item similarity scores for the individual items offered by a seller of the plurality of sellers that indicate a high similarity score;

determining a total number of individual items offered by the seller; and dividing the number of item similarity scores indicating the high similarity score by the total number of individual items offered by the seller.

7. A computer-implemented method, comprising:

identifying, by one or more computer systems of an electronic marketplace, that the electronic marketplace offers a plurality of items other than a first item associated with a customer of the electronic marketplace;

identifying a seller of the electronic marketplace that offers a second item that is similar to the first item;

computing an item similarity score for a plurality of items offered by the seller, the item similarity score being based at least in part on the plurality of items and the category associated with the first item;

determining a seller similarity score for the seller, the seller similarity score indicating a degree of similarity between the seller offering the second item and a different seller offering the first item, the similarity score being determined based at least in part on the item similarity score for the plurality of items offered by the seller; and in response to determining that the seller similarity score for the seller is over a threshold value, notifying the seller of a recommendation to offer the first item through the electronic marketplace.

8. The computer-implemented method of claim 7, further comprising identifying that the electronic marketplace identifies a plurality of items other than a first item by comparing an identifier of the first item with a plurality of identifiers corresponding to the plurality of items stored in an electronic catalog of the electronic marketplace.

9. The computer-implemented method of claim 7, further comprising:

determining a first category of the first item; and determining a second category of the second, wherein the seller is identified based at least in part on determining a similarity measure between the first category of the first item and a second category associated with the second item.

10. The computer-implemented method of claim 9, wherein identifying the seller further comprises assigning a value to the seller based at least in part on determining a number of items offered by the seller that are assigned a high similarity measure.

11. The computer-implemented method of claim 10, further comprising notifying the seller of a recommendation to offer the first item when the value assigned to the seller is greater than a pre-determined threshold value.

12. The computer-implemented method of claim 7, wherein identifying that the electronic marketplace offers a plurality of items other than the first item is performed based at least in part on identifying a search query result of a search query of the first item submitted by a user of an electronic marketplace.

13. The computer-implemented method of claim 7, wherein identifying that the electronic marketplace offers a plurality of items other than the first item is performed based at least in part on receiving a request for the item via a search query interface provided by the electronic marketplace.

14. The computer-implemented method of claim 7, wherein identifying that the electronic marketplace offers a plurality of items other than the first item is performed based at least in part on receiving a bar code scan of the image of the item submitted by the customer via the electronic marketplace.

15. A system, comprising:

a memory that stores computer-executable instructions; and a processor configured to access the memory, the processor configured to execute the computer-executable instructions to collectively at least:

receive a request for an item from a user of an electronic marketplace;

compare the item requested by the user to a list of items stored in an electronic catalog of the electronic marketplace system;

identify that the requested item is not listed in the electronic catalog, based at least in part on the comparing;

identify at least one or more sellers in the electronic marketplace system offering one or more items that are similar to the requested item, wherein the instructions that identify the at least one or more sellers cause the processor to at least:

compute an item similarity score for a plurality of items offered by the seller, the item similarity score being based at least in part on categories associated with the plurality of items and a category associated with the requested item; and determine seller similarity scores for a plurality of sellers, the respective seller similarity scores individually indicating a degree of similarity between a particular seller of the plurality of sellers and a seller of the requested item, the seller similarity score being determined based at least in part on the item similarity score for the plurality of items offered by the seller, wherein the at least one or more sellers are identified from the plurality of sellers based at least in part on the seller similarity scores; and provide a recommendation to the at least one or more sellers, to offer the requested item, based at least in part on the identifying.

16. The system of claim 15, wherein the computer-executable instructions to receive a request for an item comprises identifying information that signals the request based at least in part on a search term for the requested item submitted by the user via a search query interface provided by the electronic marketplace.

17. The system of claim 15, wherein the computer-executable instructions to receive a request for an item comprises identifying information that signals the request based at least in part on analyzing parsed network content in search results pertaining to search queries submitted by the user via a search query interface provided by third-party network content.

18. The system of claim 15, wherein the computer-executable instructions to compare the item requested by the user to a list of items stored in an electronic catalog comprises instructions to compare an identifier of the requested item with a plurality of identifiers corresponding to the list of items stored in the electronic catalog.

19. The system of claim 15, wherein the computer-executable instructions to identify the at least one or more sellers offering one or more items that are similar to the requested item is performed based at least in part on determining the category associated with the requested item.

20. The system of claim 15, wherein the computer-executable instructions to provide a recommendation comprises notifying the one or more sellers to offer the requested item via an electronic message on a user interface screen accessible by a browser application on a device operated by the one or more sellers.

21. One or more non-transitory computer-readable media collectively storing computer-executable instructions that, when executed by one or more computer systems, configure the one or more computer systems to collectively perform operations comprising:

receiving a request for an item from a user of an electronic marketplace;
identifying that the electronic marketplace offers a plurality of items other than the requested item;
determining the category of the requested item;
identifying at least one or more sellers in the electronic marketplace system offering one or more items that are similar to the requested item, wherein the instructions that identify the at least one or more sellers further comprise:
computing an item similarity score for a plurality of items offered by the seller, the item similarity score being based at least in part on categories associated with the a plurality of items and a category associated with the requested item; and
determining seller similarity scores for a plurality of sellers, the respective seller similarity scores individually indicating a degree of similarity between a particular seller of the plurality of sellers and a seller of the requested item, the seller similarity scores being determined based at least in part on the item similarity score for the plurality of items offered by the seller, wherein the at least one or more sellers are identified from the plurality of sellers based at least in part on the seller similarity scores; and
providing a recommendation to the at least one or more sellers, to offer the requested item, via the electronic marketplace.

22. The computer-readable media of claim 21, wherein receiving a request for an item comprises receiving a search term for the requested item via a search query interface provided by the electronic marketplace.

23. The computer-readable media of claim 21, wherein receiving a request for an item comprises receiving search results pertaining to search queries submitted by the user via a search query interface provided by third-party network content.

24. The computer-readable media of claim 21, wherein identifying the at least one or more sellers comprises determining a similarity measure between the requested item and the one or more items offered by the one or more sellers, based on the determined category.

* * * * *

UNITED STATES PATENT AND TRADEMARK OFFICE
CERTIFICATE OF CORRECTION

PATENT NO.       : 9,767,505 B1
APPLICATION NO.  : 14/073568
DATED            : September 19, 2017
INVENTOR(S)      : Xin Shi It is certified that error appears in the above-identified patent and that said Letters Patent is hereby corrected as shown below:

In the Claims

In Column 22, Line 14, in Claim 21, delete "the a" and insert --the--.

Signed and Sealed this
Twentieth Day of February, 2018

Andrei Iancu
*Director of the United States Patent and Trademark Office*